(12) United States Patent
Hofstetter (10) Patent No.: US 12,260,777 B2
(45) Date of Patent: Mar. 25, 2025

(54) RESIDUAL STRESS FEATURES IN ORGAN MODELS

(71) Applicant: Applied Medical Resources Corporation, Rancho Santa Margarita, CA (US)

(72) Inventor: Gregory K. Hofstetter, Rancho Santa Margarita, CA (US)

(73) Assignee: Applied Medical Resources Corporation, Rancho Santa Margarita, CA (US)

( * ) Notice: Subject to any disclaimer, the term of this patent is extended or adjusted under 35 U.S.C. 154(b) by 0 days.

(21) Appl. No.: 18/498,865

(22) Filed: Oct. 31, 2023

(65) Prior Publication Data

US 2024/0062680 A1 Feb. 22, 2024

Related U.S. Application Data

(63) Continuation of application No. 17/589,477, filed on Jan. 31, 2022, now Pat. No. 11,804,150, which is a
(Continued)

(51) Int. Cl.
*G09B 23/30* (2006.01)
*B29C 41/22* (2006.01)
(Continued)

(52) U.S. Cl.
CPC .............. *G09B 23/30* (2013.01); *B29C 41/22* (2013.01); *B29K 2083/005* (2013.01); *B29L 2031/753* (2013.01)

(58) Field of Classification Search
CPC .. G09B 23/30; B29C 41/22; B29K 2083/005; B29L 2031/753
See application file for complete search history.

(56) References Cited

U.S. PATENT DOCUMENTS

| 2,230,138 A | 1/1941 | Ewart |
| 3,775,865 A | 12/1973 | Rowan |
(Continued)

FOREIGN PATENT DOCUMENTS

| EP | 2 400 475 A1 | 12/2011 |
| WO | WO 99/57699 A1 | 11/1999 |

OTHER PUBLICATIONS

European Patent Office, The International Search Report and Written Opinion for International Application No. PCT/US2017/029281, entitled "Residual Stress Features in Organ Models," mailed Jul. 12, 2017, 14 pgs.
(Continued)

*Primary Examiner* — Steve Rowland
(74) *Attorney, Agent, or Firm* — Thomas Nguyen; Patrick Ikehara (57) ABSTRACT

Simulated tissue structures and methods of making them are disclosed. An elastic first material is placed in tension. An elastic second material is adhered to the first material while the first material is in tension. The adhered second material and the first material in tension forms a first shape of the simulated tissue structure. Tension on the first material is released. In releasing the tension of the first material, a force is exerted on the adhered second material bring the combination of the first material and the second material into a second shape. The first shape is maintained by a mold or mandrel and the second shape is the desired shape of the simulated tissue structure.

20 Claims, 7 Drawing Sheets

Related U.S. Application Data continuation of application No. 16/898,800, filed on Jun. 11, 2020, now Pat. No. 11,250,729, which is a continuation of application No. 15/566,141, filed as application No. PCT/US2017/029281 on Apr. 25, 2017, now Pat. No. 10,685,586.

(60) Provisional application No. 62/327,925, filed on Apr. 26, 2016.

(51) Int. Cl.
  *B29K 83/00* (2006.01)
  *B29L 31/00* (2006.01)

(56) References Cited

U.S. PATENT DOCUMENTS

| | | | |
|---|---|---|---|
| 3,806,573 A * | 4/1974 | Sparks | A61F 2/062 264/136 |
| 3,985,601 A | 10/1976 | Panagrossi | |
| 4,737,219 A | 4/1988 | Taller et al. | |
| 4,819,478 A * | 4/1989 | Melcher | G01N 30/00 73/61.53 |
| 5,087,394 A | 2/1992 | Keith | |
| 5,873,732 A | 2/1999 | Hasson | |
| 5,935,164 A | 8/1999 | Iversen | |
| 6,530,865 B2 | 3/2003 | Held | |
| 6,592,539 B1 * | 7/2003 | Einarsson | A61F 5/0109 623/32 |
| 6,712,833 B1 | 3/2004 | Lee et al. | |
| 6,997,719 B2 | 2/2006 | Wellman et al. | |
| 7,866,983 B2 | 1/2011 | Hemphill et al. | |
| 8,221,129 B2 | 7/2012 | Parry et al. | |
| 8,250,672 B2 * | 8/2012 | Lipinski | C08J 7/0427 524/415 |
| 8,491,309 B2 | 7/2013 | Parry et al. | |
| 8,808,004 B2 | 8/2014 | Misawa et al. | |
| 8,888,498 B2 | 11/2014 | Bisaillon et al. | |
| 9,011,158 B2 | 4/2015 | Merkle et al. | |
| 9,280,917 B2 | 3/2016 | Parry, Jr. et al. | |
| 2005/0016548 A1 | 1/2005 | Brassel | |
| 2009/0024215 A1 * | 1/2009 | Lesh | A61F 2/12 604/264 |
| 2012/0276511 A1 | 11/2012 | Parry et al. | |
| 2014/0024004 A1 | 1/2014 | Tvermoes et al. | |
| 2014/0087346 A1 | 3/2014 | Breslin et al. | |
| 2014/0087347 A1 | 3/2014 | Tracy et al. | |

OTHER PUBLICATIONS

The International Bureau of WIPO, International Preliminary Report on Patentability for International Application No. PCT/US2017/029281, entitled "Residual Stress Features in Organ Models," dated Nov. 8, 2018, 9 pgs.

European Patent Office, Extended European Search Report for European Patent Application No. EP 20189760.0, titled "Residual Stress Features in Organ Models," dated Nov. 25, 2020, 9 pgs.

* cited by examiner

RESIDUAL STRESS FEATURES IN ORGAN MODELS

CROSS-REFERENCE TO RELATED APPLICATIONS

This application is a continuation of U.S. patent application Ser. No. 17/589,477 entitled Residual stress features in organ models" filed on Jan. 31, 2022, which is a continuation of U.S. patent application Ser. No. 16/898,800 entitled Residual stress features in organ models" filed on Jun. 11, 2020, now issued as U.S. Pat. No. 11,250,729, which is a continuation of U.S. patent application Ser. No. 15/566,141 filed on Oct. 12, 2017, now issued as U.S. Pat. No. 10,685,586, entitled Residual stress features in organ models" which claims priority to and benefit of and is the U.S. national phase under 35 U.S.C. § 371 of International Application No. PCT/US2017/029281 filed on Apr. 25, 2017 which claims priority to and benefit of U.S. Provisional Patent Application Ser. No. 62/327,925 entitled "Residual stress features in organ models" filed on Apr. 26, 2016 both of which are incorporated herein by reference in their entirety.

FIELD OF THE INVENTION

This invention relates to surgical training tools, and in particular, to simulated tissue structures and organ models for teaching and practicing surgical procedures and methods for making them.

BACKGROUND OF THE INVENTION

A highly-skilled operation technique is required of surgeons, in general, and, in particular, for performing laparoscopic surgical procedures. In laparoscopic surgery, several small incisions are made in the abdomen for the insertion of trocars or small cylindrical tubes approximately 5 to 10 millimeters in diameter through which surgical instruments and a laparoscope are placed into the abdominal cavity. The laparoscope illuminates the surgical field and sends a magnified image from inside the body to a video monitor giving the surgeon a close-up view of organs and tissues. The surgeon performs the operation by manipulating the surgical instruments placed through the trocars while watching the live video feed on a monitor. Because the surgeon does not observe the organs and tissues directly with the naked eye, visual information is obtained by a two-dimensional image on a monitor instead of a three-dimensional observation. The loss of information when presenting a three-dimensional environment via a two-dimensional image is substantial. In particular, depth perception is reduced when viewing a two-dimensional image as a guide for manipulating instruments in three dimensions.

Furthermore, because the trocars are inserted through small incisions and rest against the abdominal wall, the manipulation of instruments is restricted by the abdominal wall which has a fulcrum effect on the instrument. The fulcrum effect defines a point of angulation that constrains the instrument to limited motion. Also, hand motion in one linear direction causes magnified tip motion in the opposite direction. Not only is the instrument motion viewed on the screen in the opposite direction, but also, the magnified tip motion is dependent on the fraction of the instrument length above the abdominal wall. This lever effect not only magnifies motion but also magnifies tool tip forces that are reflected to the user. Hence, the operation of an instrument with a fulcrum requires intentional learning and practice and is not intuitively obvious.

Also, surgical instruments are placed through ports having seals which induce a stick-slip friction caused by the reversal of tool directions. For example, stick-slip friction may arise from the reversal of tool directions when, for example, quickly changing from pulling to pushing on tissue. During such motion, rubber parts of the seals rub against the tool shaft causing friction or movement of the instrument with the seal before the friction is overcome and the instrument slides relative to the seal. Stick-slip friction, or oil-canning, at the seal and instrument interface creates a non-linear force.

Hand-eye coordination skills are necessary and must be practiced in order to correlate hand motion with tool tip motion especially via observation on a video monitor. Also, in laparoscopic surgery, tactile sensation through the tool is diminished. Because haptics are reduced or distorted, the surgeon must develop a set of core haptic skills that underlie proficient laparoscopic surgery. The acquisition of all of these skills is one of the main challenges in laparoscopic training and the present invention is aimed at improving systems and methods for laparoscopic skills training and technique performance.

Not only do new practitioners have to learn laparoscopic skills, but also, experienced laparoscopic surgeons seek to polish old skills as well as to learn and practice new surgical techniques that are unique to newly introduced surgical procedures. While training can be acquired in the operating room, interest in devising faster and more efficient training methods, preferably outside the operating room has increased. Surgeons that attain a reasonable level of skills outside the operating room are better prepared when they enter the operating room and, thereby, valuable operating room experience can thus be optimized, lowering the risk to patients and reducing costs. To acquaint surgeons with basic surgical skills outside the operating room, various simulators have been devised and tested. An example of a surgical simulator is the SIMSEI® laparoscopic trainer manufactured by Applied Medical Resources Corporation in California and described in U.S. Pat. No. 8,764,452 incorporated by reference herein in its entirety. The SIMSEI® laparoscopic trainer employs three-dimensional live or fake organs inside a simulated abdominal cavity that is obscured from direct observation by the user.

Use of a live human or animal organ in a laparoscopic simulator requires freshness for the internal organ. Also, live organs require sanitary arrangements to be made to protect the trainee from being infected by germs and the like. Additional costs are also required for the sanitary management and sterilization of instruments which are used after the exercise of a surgical operation is performed. Also, the used live organ must be properly disposed. Furthermore, the smell of a live organ can be fowl and may distract the trainee from focusing on techniques and skills. Therefore, artificial organs and tissues that simulate live organs and tissues are desirable so that live organs can be replaced in surgical training.

Many artificial organs have been used in place of live human or animal organs in surgical training. Typically, these artificial organ models are made of silicone, urethane elastomer, styrene elastomer or the like. These artificial organs must respond properly when incised, manipulated or sutured, for example, and provide the same feeling and tactile characteristics as in real life surgery. However, many artificial organs lack certain properties and realism that are necessary to bridge the gap between artificial and real organs. Furthermore, the degree of realism must be targeting to provide means for teaching the skills that are peculiar to laparoscopic skills training. As such, certain realisms may be more important in a laparoscopic environment when compared to an open surgical environment. Therefore, there is a need for artificial organs and tissues and, in particular, for artificial organs and tissues that are targeted for laparoscopic skills training that may also be used for non-laparoscopic skills training.

SUMMARY OF THE INVENTION

According to one aspect of the invention, a method of making a simulated tissue structure is provided. The method includes the step of providing a mandrel having a first end, a second end, a longitudinal axis and an outer diameter. The method includes the step of providing at least one elastic ring having a central aperture. The at least one elastic ring has a relaxed diameter that is smaller than the outer diameter of the mandrel. The method includes the step of stretching the at least one elastic ring onto the mandrel in a direction traverse to the longitudinal axis of the mandrel into a position in which the mandrel is located inside the central aperture and the at least one ring is expanded around the outer diameter of the mandrel. The method includes the step of applying a layer of uncured silicone onto the mandrel and the at least one stretched elastic ring. The method includes the step of curing the layer to adhere the layer to the elastic rings while the elastic ring is expanded. The method includes the step of removing the layer and the elastic rings after the step of curing the layer. The method includes the step of allowing the elastic ring to return toward its relaxed diameter.

According to another aspect of the invention, a method of making a simulated tissue structure is provided. The method includes the step of providing at least one elastic strip. The strip has a length and a width. The relaxed length is longer than the width. The method includes the step of stretching the elastic strip to elongate its length. The method includes the step of applying a layer of uncured silicone to the elastic strip while the strip is elongated. The method includes the step of curing the layer to adhere the layer to the stretched elastic strip. The method includes the step of releasing the elastic strip from being stretched and elongated after the step of curing the layer.

According to another aspect of the invention, a method of making a simulated tissue structure is provided. The method includes the step of providing at least one elastic sheet. The sheet has a length along a longitudinal axis, a width along a lateral axis and a thickness defined between an upper surface and a lower surface. The method includes the step of stretching the elastic sheet. The method includes the step of applying a layer of uncured silicone to the elastic sheet while the sheet is maintained in a stretched position. The method includes the step of curing the layer to adhere the layer to the stretched elastic strip. The method includes the step of relaxing the stretched elastic strip after the step of curing the layer.

According to another aspect of the invention, a method for making a simulated tissue structure is provided. The method includes the step of providing an elastic first material having a relaxed state having an unstretched width and an unstretched length. The method includes the step of stretching the first material. The method includes the step of providing a second material. The method includes the step of adhering the second material to the first material while the first material is stretched and while the first material and second material are held in a first shape. The method includes the step of allowing the first material to return toward the relaxed stated to form a simulated tissue structure having a second shape that is different from the first shape.

According to another aspect of the invention, a simulated tissue structure is provided. The simulated tissue structure includes a first layer of elastic material having a length along a longitudinal axis and a width along a lateral axis. The simulated tissue structure includes a second layer of elastic material connected to the first layer such that the first layer exerts a compression force on the second layer along at least one of the longitudinal axis and the lateral axis when in a first shape. The compression force moves the first layer and the second layer into a second shape defined by the compression force being in equilibrium with the second layer; the second shape being an anatomical shape.

DETAILED DESCRIPTION OF THE INVENTION

The following description is provided to enable any person skilled in the art to make and use the surgical tools and perform the methods described herein and sets forth the best modes contemplated by the inventors of carrying out their inventions. Various modifications, however, will remain apparent to those skilled in the art. It is contemplated that these modifications are within the scope of the present disclosure. Different embodiments or aspects of such embodiments may be shown in various figures and described throughout the specification. However, it should be noted that although shown or described separately each embodiment and aspects thereof may be combined with one or more of the other embodiments and aspects thereof unless expressly stated otherwise. It is merely for easing readability of the specification that each combination is not expressly set forth.

There are multiple anatomical examples within the human body where there are valves that are able to contract, where tissue planes come together and taper, or tissue planes which are under tension in their normal state. Additionally, there are anatomical structures within the body that stretch preferentially in a certain direction and not another. All of these examples are difficult to simulate while creating organ models using current manufacturing techniques.

According to the present invention, the process of manufacturing such a simulated tissue structure 10 generally includes providing a pre-made silicone piece or sheet. The piece of silicone is stretched and held in place in the stretched configuration. While the sheet is stretched, uncured silicone liquid is applied over the stretched silicone piece and allowed to cure to create a layer. When the wet silicone is finished curing, the final product is removed from the mold or mandrel. The premade stretched silicone relaxes, tending toward its unstretched configuration which changes the shape of the final silicone object including the layer. In an alternative variation, a piece or sheet of elastic mesh is employed instead of pre-made piece or sheet of silicone and uncured silicone is applied over the stretched piece of elastic mesh and allowed to cure to create a layer. When mesh is used, the final shape of the simulated tissue structure is less dramatic compared to the stretched silicone as wet silicone fills the interstices of the mesh reducing the degree of retraction. However, the stretch characteristics resulting in the final simulated tissue structure can be advantageously tailored to limit stretch in one direction while allowing full stretch in another direction. In yet another variation, instead of applying uncured silicone to the stretched piece of silicone or stretched piece of mesh, a piece of cured silicone that is at rest and not stretched is glued in place to the stretched piece.

Figure 1:
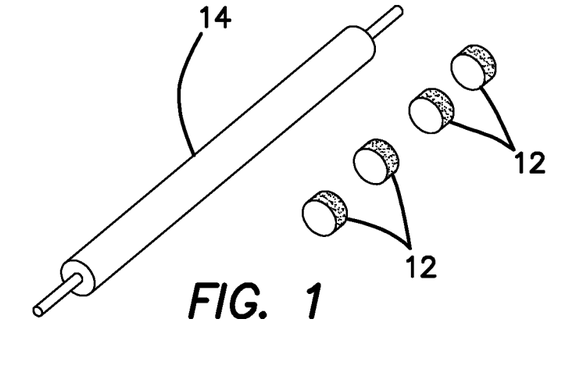
FIG. 1 is a top perspective view of a mandrel and a plurality of unstretched silicone rings according to the present invention.
Figure 2:
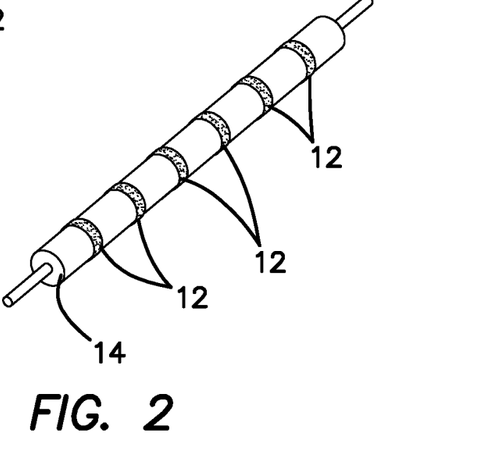
FIG. 2 is a top perspective view of a plurality of silicone rings stretched around a mandrel according to the present invention.
Figure 3:
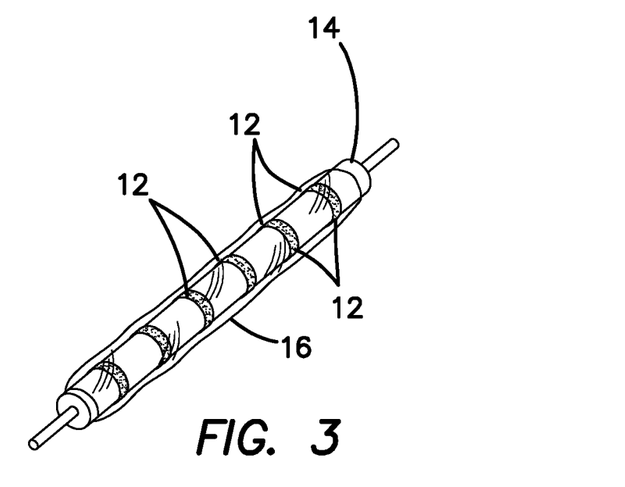
FIG. 3 is a top perspective view of a plurality of silicone rings stretched around a mandrel and overlaid with a silicone layer according to the present invention.
Figure 4:
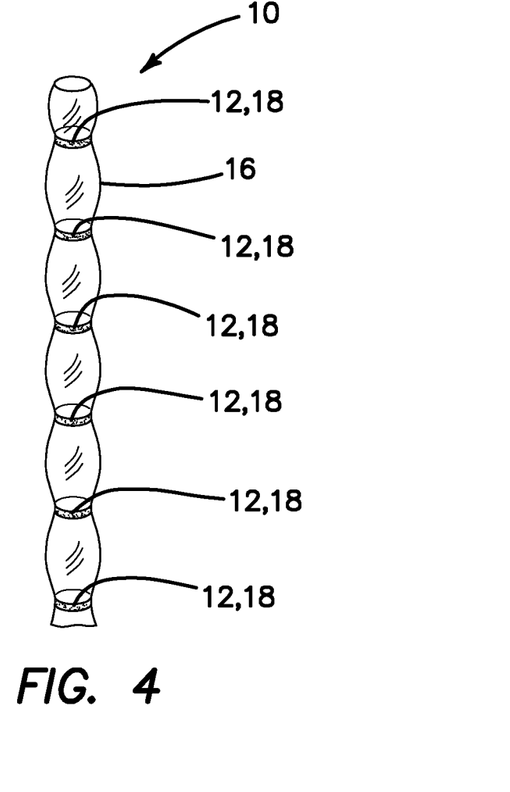
FIG. 4 is a top perspective view of a simulated tissue structure according to the present invention.

With particular reference to FIGS. 1-4, in one variation of this method, silicone ring-shaped bands 12 are placed on a cylindrical mandrel 14. The pre-made, silicone ring-shaped bands 12 and mandrel 14 are provided as shown in FIG. 1. The mandrel 14 has an outer diameter that is larger than the resting, unstressed diameter of the bands 12. Before the mandrel 14 is placed in the mandrel-turning device, a number of pre-made, cured, silicone bands 12 are stretched over the mandrel 14 and spread out evenly along its length as shown in FIG. 2. Then, a layer of uncured silicone 16 is painted on the mandrel 14 and over the premade stretched silicone rings 12 as shown in FIG. 3 while the mandrel 14 is rotating. The silicone layer 16 is allowed to cure. Afterwards, the simulated tissue structure 10 is removed from the mandrel 14. When multiple bands 12 are stretched over a mandrel 14 and then removed from the mandrel 14 along with the cured silicone layer 16, the bands 12 will tend to return to their normal, reduced resting shape and diameter. The outer layer 16 is cured to the bands 12 interconnecting them into a unitary structure 10 as shown in FIG. 4. The resulting unitary simulated tissue structure 10 has a plurality of locations 18 of reduced diameter in the same locations of the bands 12 as shown in FIG. 4. The simulated tissue structure 10 will be substantially cylindrical, tubular in shape with a central lumen extending along a longitudinal axis between an opening at the proximal end and an opening at the distal end. The simulated tissue structure 10 in the reduced-diameter locations 18 forms an undulating silicone tube when removed from the mandrel 14 that simulates the look and feel of a real colon. In this way, this method can be used for creating simulated valves of Houston, for example, within the colon.

Figure 5:
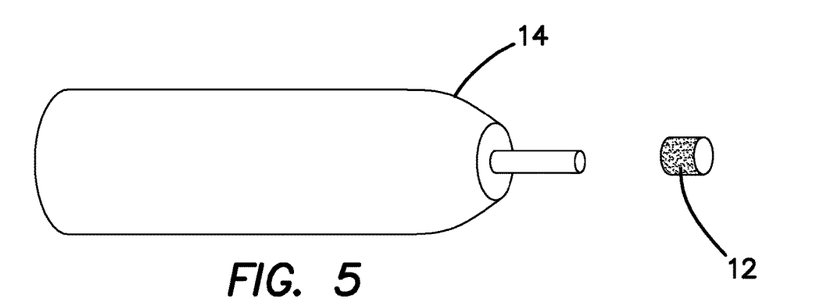
FIG. 5 is a top perspective view of a mandrel and unstretched silicone ring according to the present invention.
Figure 6:
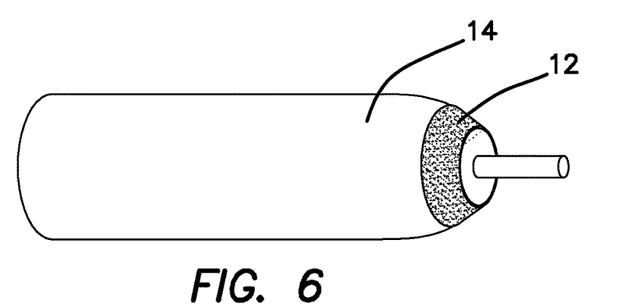
FIG. 6 is a top perspective view of a silicone ring stretched around one end of a mandrel according to the present invention.
Figure 7:
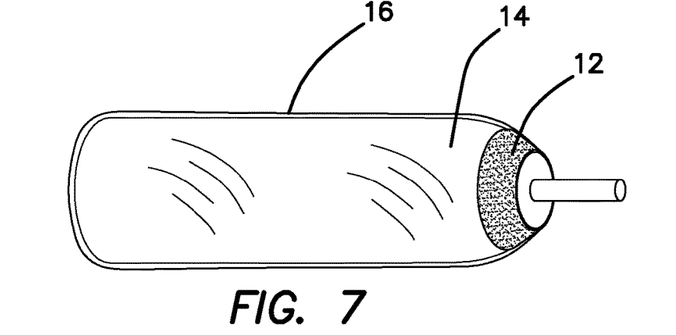
FIG. 7 is a top perspective view of a silicone ring stretched around a mandrel and overlaid with a silicone layer according to the present invention.
Figure 8:
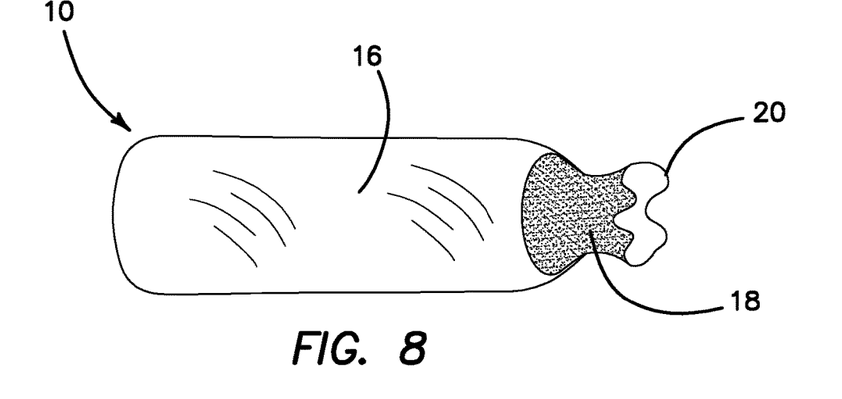
FIG. 8 is a top perspective view of a simulated tissue structure according to the present invention.

In another variation of this method, simulated tissue structures 10 having simulated natural orifices 20 through which simulated surgery is practiced are created. For example, to make a simulated natural orifice 20, such as a simulated anus, a premade silicone ring-shaped band 12 and mandrel 14 are provided as shown in FIG. 5. The mandrel 14 has an outer diameter that is greater than the unstretched, resting inner diameter of the band 12 in the desired location along the mandrel 14 where the simulated natural orifice 20 is desired to be created. The band 12 is stretched around that desired location of the mandrel, in this case, around one end of a mandrel 14 as shown in FIG. 6, and a layer 16 of wet silicone is painted onto the mandrel 14 and band 12 as shown in FIG. 7. The silicone layer 16 is allowed to cure and then the construct is removed from the mandrel 14. As a result of the layer 16 curing onto the stretched cured silicone band 12, the location of the band 12, the end with the premade silicone band 12 tends to return to its normal unstretched diameter creating an area location 18 of reduced diameter of the simulated tissue structure 10 compared to the surrounding outer layer 16 of cured silicone as shown in FIG. 8. In a variation of this method, the formed shrunken end with a reduced diameter may then be stretched again, this time, over a central peg on a trans-anal adapter mold (not shown). Another layer of silicone is then applied to the stretched end by pouring silicone into the mold and allowed to attach to the band and first layer. Once cured, the pre-stretched construct is removed from the peg and the band again shrinks back to its original size.

Figure 9:
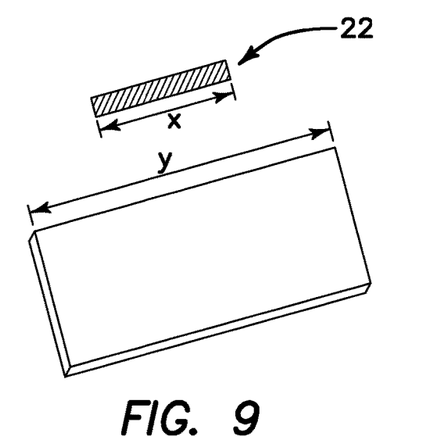
FIG. 9 is a top perspective view of an unstretched silicone strip adjacent to a mold according to the present invention.
Figure 10:
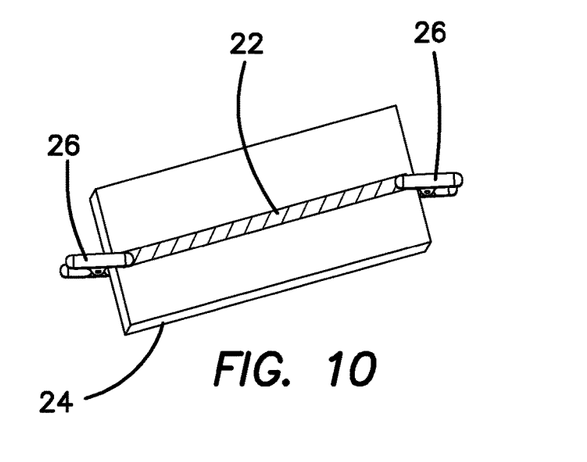
FIG. 10 is a top perspective view of a stretched silicone strip clipped to a mold according to the present invention.
Figures 11, 12:
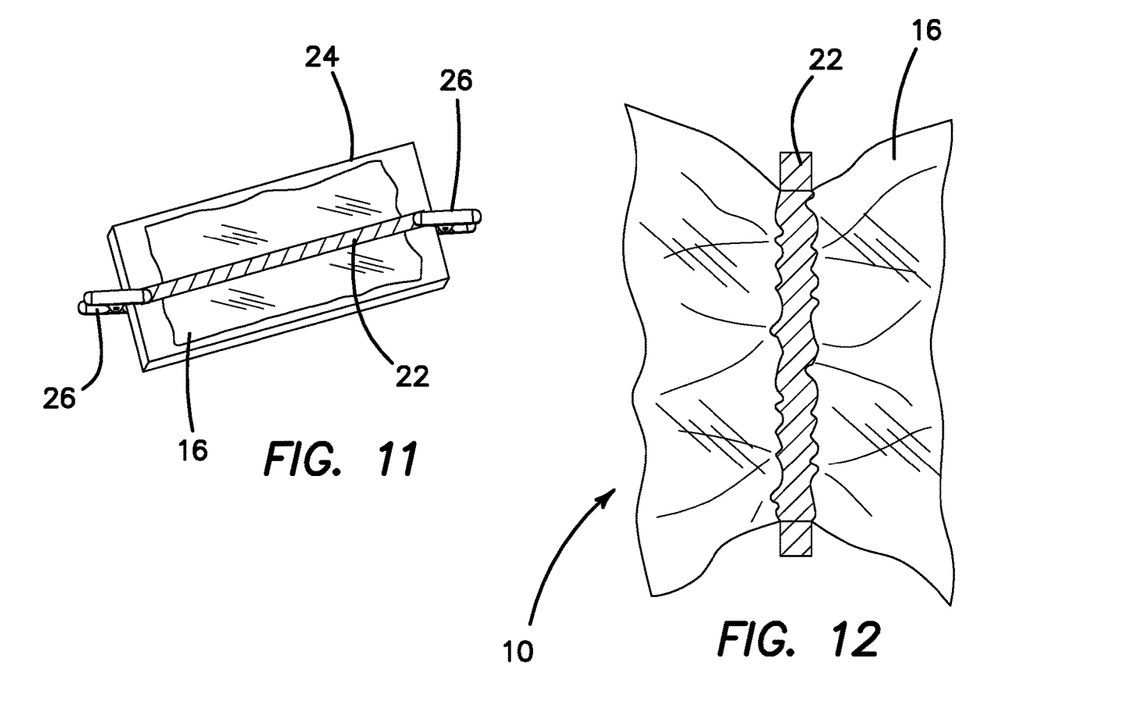
FIG. 11 is a top perspective view of a stretched silicone strip clipped to a mold overlaid with a layer of silicone according to the present invention.
FIG. 12 a top perspective view of a simulated tissue structure according to the present invention.

In another variation of this method, a strip 22 of cured silicone having a resting length x is provided as shown in FIG. 9. The strip 22 of silicone is stretched to length y and held in place at length y which is greater than length x as shown in FIG. 10. The strip 22 can be attached to a mold 24, for example, or on a mandrel 14 by some means such as clips 26 as shown in FIG. 10. A layer 16 of wet, uncured silicone is applied over and around the stretched strip 22 as shown in FIG. 11. The uncured silicone layer 16 is allowed to cure. Removing the construct from the mold 24 or mandrel 14 entails releasing the force keeping the strip 22 stretched. As a result, the strip 22 will tend to return toward its normal relaxed length, x, moving, contracting the cured layer 16 of silicone surrounding it creating wrinkles and bunching around the strip 22 as shown in FIG. 12. When the workpiece is removed from the mold or mandrel, the stretched strip will relax, causing bunching of the newer, now cured silicone layer 16 as shown in FIG. 12.

Figure 13:
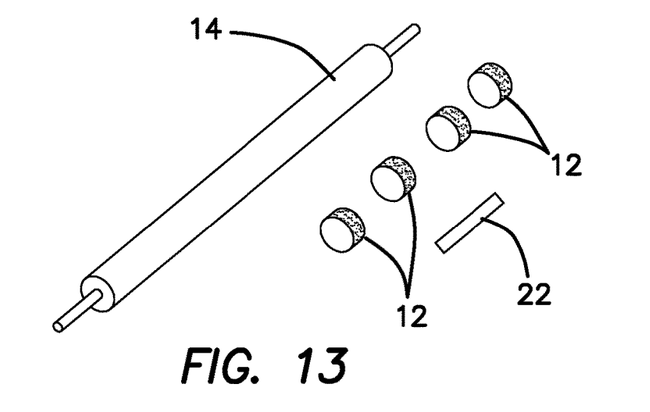
FIG. 13 is a top perspective view of a mandrel, a plurality of unstretched silicone rings, and an unstretched silicone strip according to the present invention.
Figure 14:
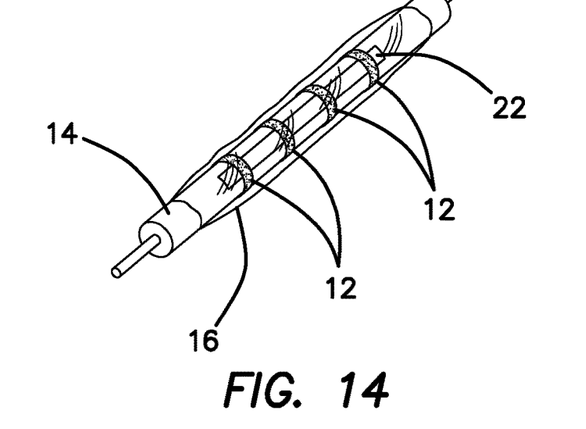
FIG. 14 is a top perspective view of a plurality of silicone rings stretched around a mandrel and a strip stretched alongside the mandrel overlaid with a layer of silicone according to the present invention.
Figure 15:
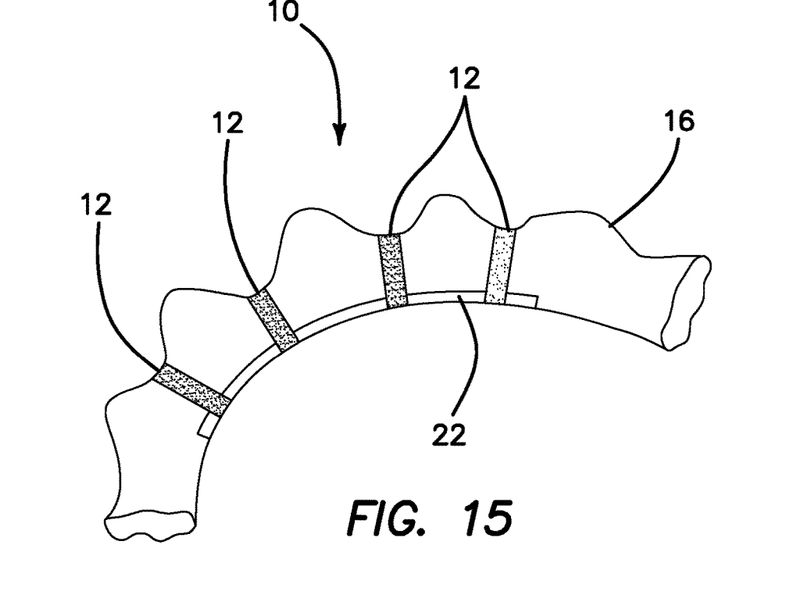
FIG. 15 is a top perspective view of a simulated tissue structure according to the present invention.

Turning now to FIGS. 13-15, a combination of one or more methods may be employed. For example, bands 12 together with a strip 22 may be employed over a mandrel 14. One or more bands 12, a mandrel 14 and at least one strip 22 are provided as shown in FIG. 13. The bands 12 have a resting inner diameter that is smaller than the outer diameter of the mandrel 14. The strip 22 has a resting length, x, and is stretched to length, y, and held in place along the mandrel 14 as shown in FIG. 14. The circular, hoop-shaped bands 12 are stretched and placed over the strip 22 and mandrel as shown in FIG. 14. Alternatively, the bands 12 are stretched and placed between the strip 22 and mandrel 14. An outer layer 16 of uncured, wet silicone is applied to the one or more bands 12, one or more strip 22 and onto the mandrel 14 as shown in FIG. 14 and allowed to cure. When the outer layer has finished curing, the construct is removed from the mandrel 14 and the resulting simulated tissue structure 10 is shown in FIG. 15. As can be seen in FIG. 15, when the cured construct is removed, the bands 12 will tend to return to their resting, normal diameter/configuration pulling the cured silicone layer 16 inwardly to create a tubular structure with valleys or tubular structure with reduced radial dimensions in the location of the rings 12. Also, the stretched strip 22 will tend to return to its normal, resting dimension and shorten bringing the cured silicone layer 16 into contraction along the length of the strip 22, thereby, in some cases, as show in FIG. 14, imparting the resulting tissue structure 10 with a natural curvature having a concavity in the outer layer 16 on the side with the strip 22.

Figures 16, 17, 18:
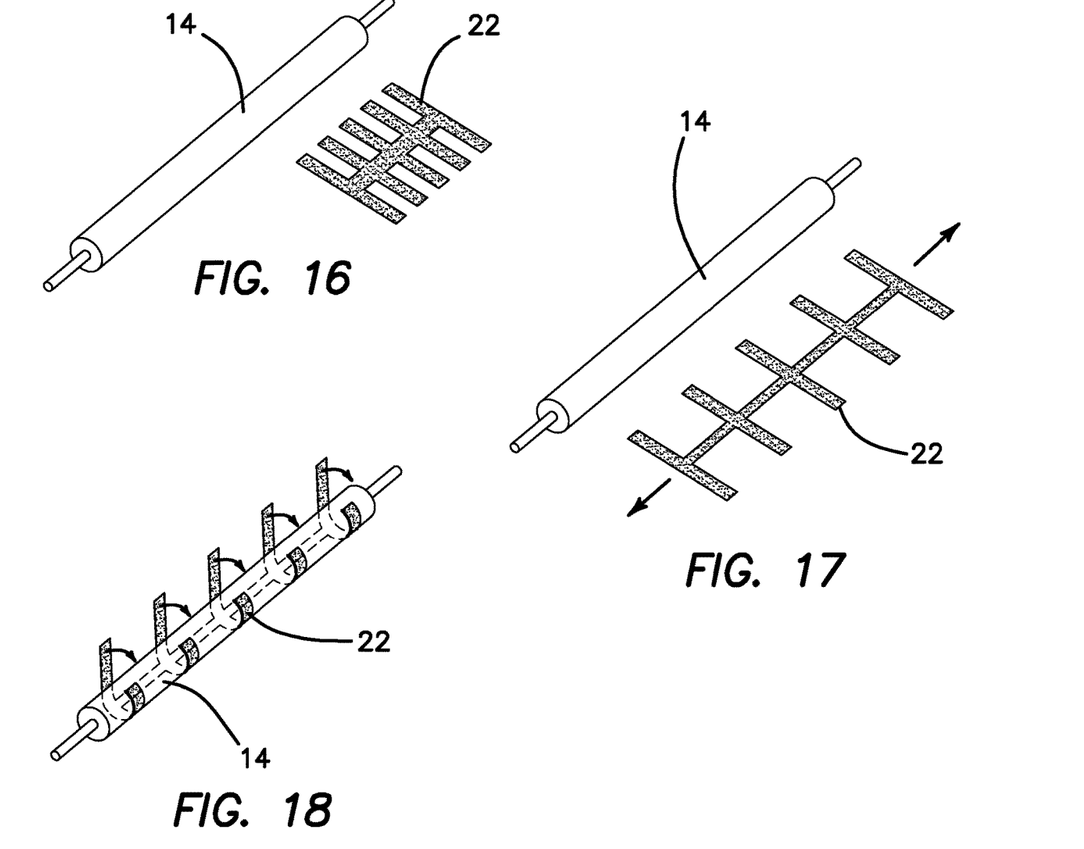
FIG. 16 is a top perspective of view of a mandrel and unstretched, patterned sheet according to the present invention.
FIG. 17 is a top perspective view of a mandrel and a stretched, patterned sheet according to the present invention.
FIG. 18 is a top perspective view of a mandrel partially wrapped by a stretched, patterned sheet according to the present invention.
Figure 19:
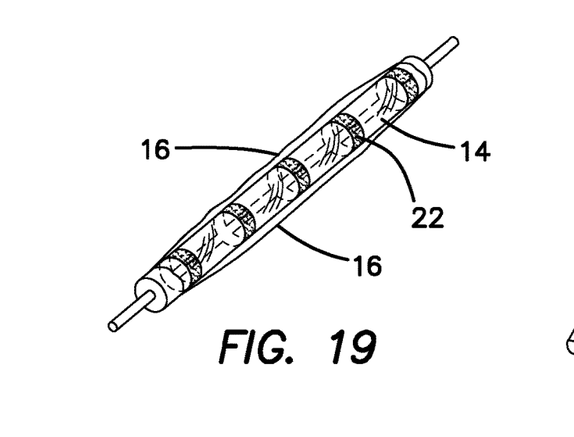
FIG. 19 is a top perspective view of a mandrel wrapped by a stretched, patterned sheet overlaid with a layer of silicone according to the present invention.
Figure 20:
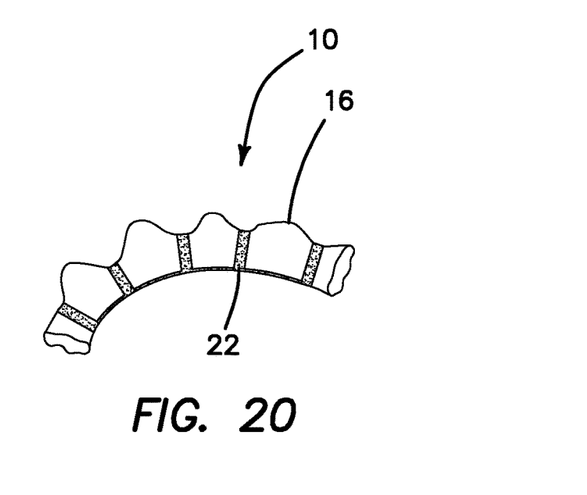
FIG. 20 is a top perspective view of a simulated tissue structure according to the present invention.

Turning now to FIGS. 16-20, there is shown another variation of making a simulated tissue structure 10 in which a patterned strip 22 is employed over a mandrel 14. The patterned strip 22 is a piece of cured silicone and/or mesh material that is cut into a desired pattern/shape. The mesh if employed is stretchable mesh. In the variation shown in FIGS. 16-20, the pattern strip 22 has a repeating H-like shape having a longitudinal spine intersected by lateral strips. The pattern strip 22 is stretched longitudinally along the mandrel 14 in the direction of the arrows in FIG. 17. The pattern strip 22 is wrapped around the mandrel 14 while stretched as shown in FIG. 18 and adhered in position on the mandrel 14 with adhesive or other fastener. Then a layer 16 of uncured silicone is applied over the stretched pattern strip 22 and over the mandrel 14 and allowed to cure. When the layer 16 is cured, the construct is removed from the mandrel 14. The cured layer 16 is bonded to the pattern strip 22 and the stretched pattern strip 22 and/or mesh naturally relaxes and returns to an unstretched, equilibrium configuration resulting in the unique luminal simulated tissue structure 10 shown in FIG. 20 having a directional curvature imparted by the spine of the pattern strip 16 with bulbous portions formed between the lateral strips where openings were formed by the spaces between the lateral strips.

Figure 21:
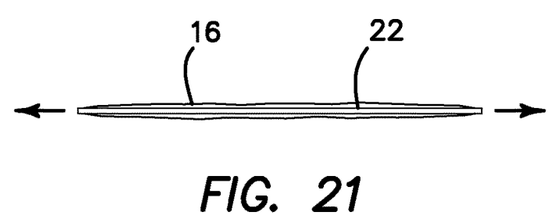
FIG. 21 is a top perspective view of a strip of elastic material overlaid with a layer of silicone according to the present invention.
Figure 22:
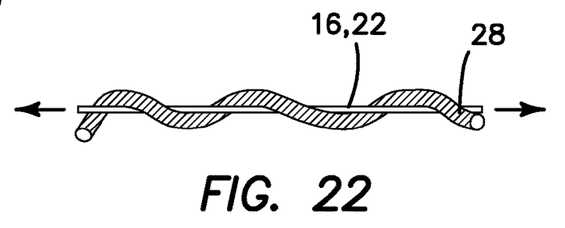
FIG. 22 is a top perspective view of an elongate vessel placed on a strip of elastic material in spiral fashion while stretched in the direction of the arrows according to the present invention.
Figure 23:
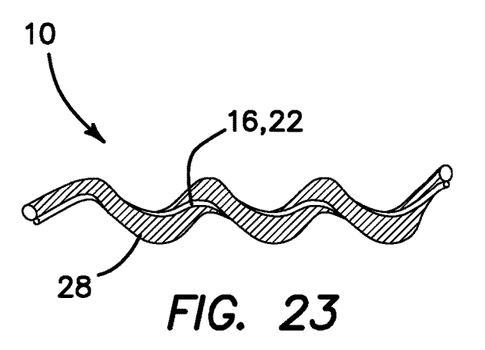
FIG. 23 is a top perspective view of a simulated tissue structure of FIG. 22 in an equilibrium state according to the present invention.

Turning now to FIGS. 21-23, another variation for forming a simulated tissue structure 10 is shown. A thin strip 22 of cured silicone is stretched along its longitudinal axis as shown by the arrows in FIG. 21. While in the stretched position, a thin layer 16 of uncured silicone is applied to the surface of the stretched strip 22. While the layer 16 is still wet, a solid or hollow tubular vessel 28 made of silicone is placed on the stretched strip 22. In one variation, the vessel 28 is placed in spiral fashion around the stretched strip 22 as shown in FIG. 22. The vessel 28 is wrapped around without tension in the vessel 28 and the wet layer 16 of silicone is allowed to cure to adhere the vessel 28. When cured, the final simulated tissue structure 10 is a spiraled, tortuous vessel shown in FIG. 23.

Figure 24:
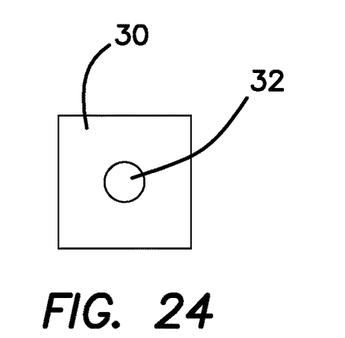
FIG. 24 is top view of a sheet of elastic material with a hole in a relaxed condition according to the present invention.
Figure 25:
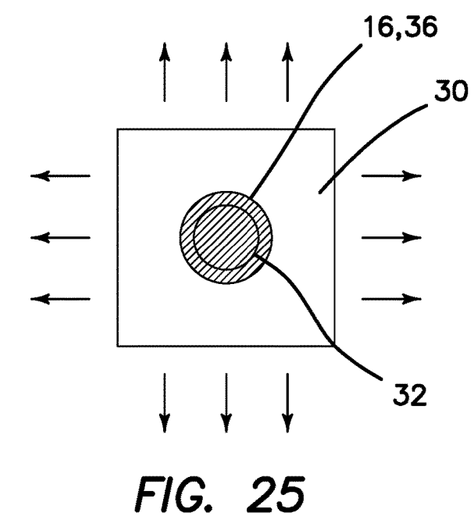
FIG. 25 is a top view of a sheet in a stretched condition with a hole covered with a layer of silicone cured to the sheet while the sheet is stretched according to the present invention.
Figure 26:
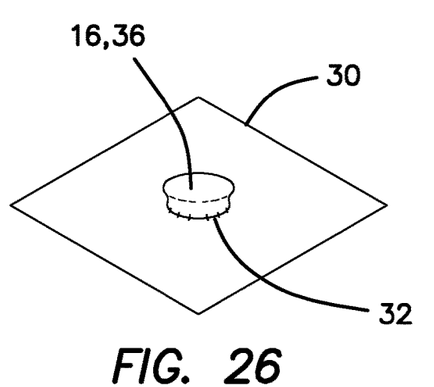
FIG. 26 is a top perspective view of a simulated tissue structure of FIG. 25 in equilibrium, unstretched state according to the present invention.

Turning now to FIGS. 24-26, another variation for forming a simulated tissue structure 10 is shown. A pre-made sheet 30 of silicone is provided. A hole 32 is cut out of the sheet 30 as shown in FIG. 24. The sheet 30 with the hole is uniformly stretched as shown by the arrows in FIG. 25. The hole 32 may be any suitable size and shape. A layer 16 of uncured silicone is applied to over the stretched hole 32 and allowed to cure as shown in FIG. 25. Alternatively, a pre-made, cured silicone patch 36 that is slightly larger than the stretched hole 32 and having a complementary shape is glued in place on the stretched hole 32 as shown in FIG. 25. In both cases, when the sheet 30 is released and removed from the staging platform, the sheet 30 returns to an unstretched equilibrium position and now has a dome feature formed by the cured silicone layer 16 in an otherwise flat sheet 30. The domed feature of layer 16 extends upwardly from the relaxed flat sheet 30 as shown in FIG. 26.

Figure 27:
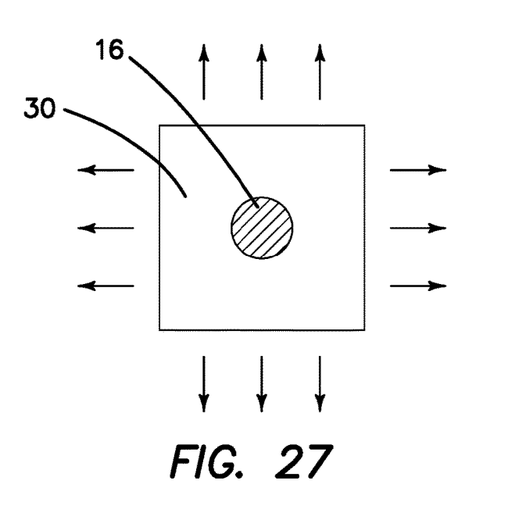
FIG. 27 is a top view of a sheet in a stretched condition with a layer of silicone cured to the sheet while the sheet is stretched in the direction of the arrows according to the present invention.
Figure 28:
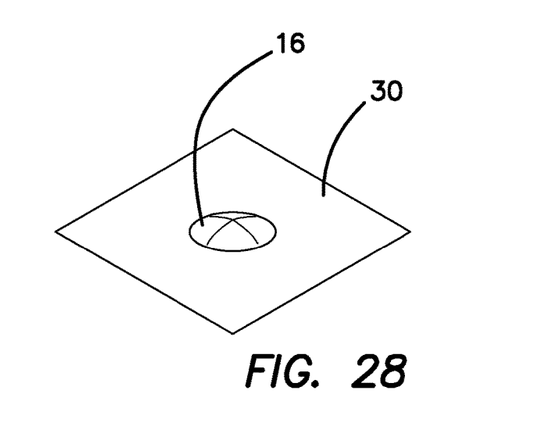
FIG. 28 is a top perspective view of a simulated tissue structure of FIG. 25 in an equilibrium, unstretched condition according to the present invention.

Turning now to FIGS. 27-28, in another variation, the flat, cured silicone sheet 30 does not have a hole in it. The sheet 30 without a hole is uniformly stretched in the direction of the arrows in FIG. 27 and an uncured silicone layer 16 is applied on one or more areas of the sheet 30. Areas on the sheet 30 that have wet silicone applied and cured will curl away from the newly added silicone layer 16, that is, in the areas of applied silicone layer 16, the side of the construct having the layer 16 of newly applied silicone will be convex and the side of the sheet 30 that was stretched will be concave. This technique is useful to tailor the shape of otherwise flat sheets that are used to create simulated anatomy particularly in areas where thin membranous layers join to other structures.

Figures 29, 30, 31:
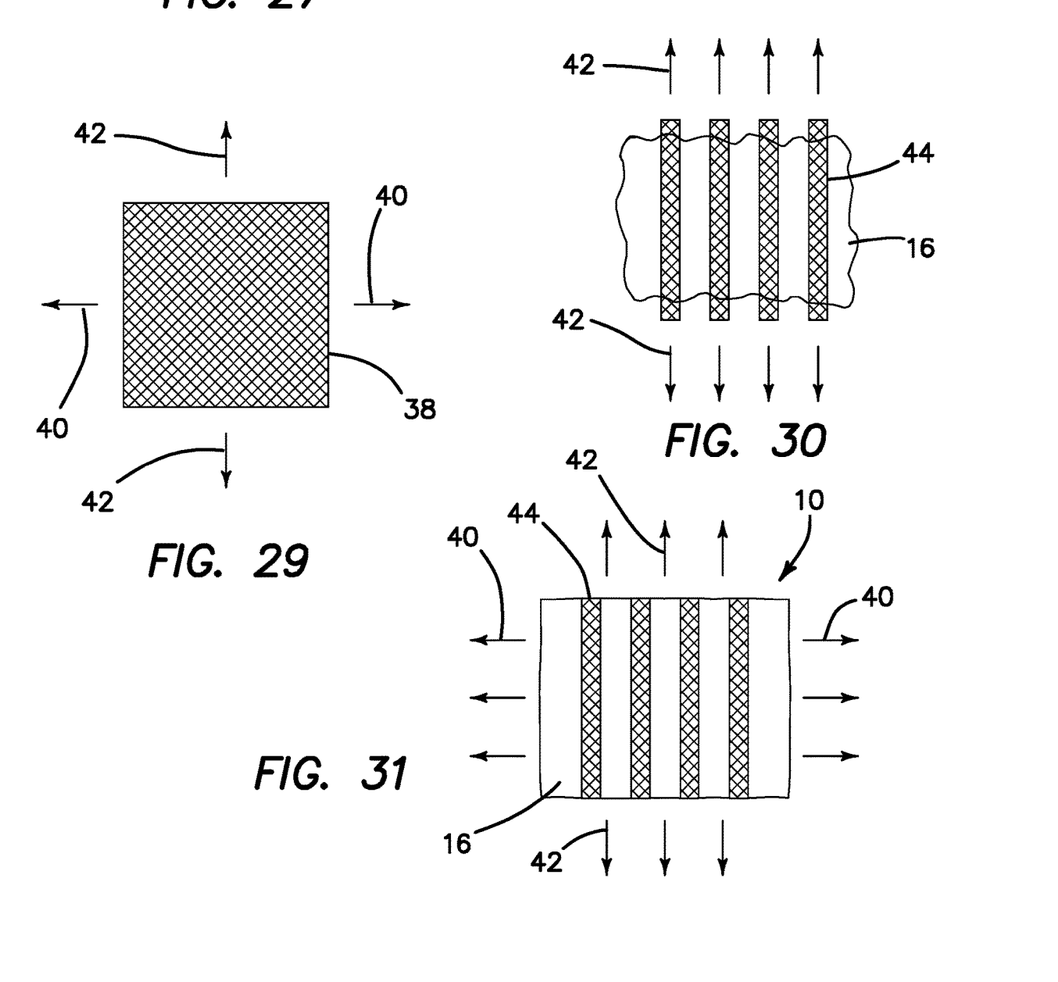
FIG. 29 is a top view of a layer of mesh material according to the present invention.
FIG. 30 is a top view of a plurality of strips of mesh material spaced apart, stretched in the direction of the arrows and a layer of silicone cured to the strips while the strips are stretched according to the present invention.
FIG. 31 is a top view of a simulated tissue structure according to the present invention.

With reference to FIGS. 29-31, another variation of forming a simulated tissue structure 10 according to the present invention is shown. As mentioned previously, when mesh is employed and stretched and an uncured layer of silicone is applied to the stretched mesh, the wet silicone enters the interstices of the mesh and the qualities the simulated tissue structure 10 arising from the retraction of the mesh material are less pronounced relative to a non-porous material. However, a mesh-based simulated tissue structure 10 provides advantageous tactile properties. A mesh layer 38 is provided and by stretching the mesh layer 38 to its elastic limit in only one direction, while leaving the mesh layer 38 relaxed in the other direction, simulated anatomical structures that stretch preferentially in one direction over another can be created. This application of a mesh layer 38 in a simulated tissue structure wherein the mesh layer 38 is stretched in one direction before the application of a layer 16 of uncured silicone can be used to make sheets that stretch preferentially or other simulated anatomical structures such as simulated tendons that are flexible enough to bend but do not readily stretch. Another example of this would be incorporating a strip of mesh into the sidewall of a simulated bowel so that when it is insufflated, the simulated bowel will expand circumferentially but not longitudinally. The mesh material is an interwoven or intertwined braid or network of grouped or ungrouped interlocking filaments creating an open texture structure with small substantially uniform windows/interstices. The braid of the mesh such that two intersecting systems of filamentary elements are interlaced so that each filamentary element of one system is alternatively guided over and under each filamentary element of the other system. Such a pattern of the braid is referred to as a plain weave. The number of intersections within a unit of length of measure defines the density of the weave with more intersections making the weave tighter and the size of the windows becomes smaller. Because of the weave arrangement and density, the mesh material can stretch along the lateral axis as the bands can slide over and relative to each other making the windows larger in size. Widening of the mesh when stretched laterally reduces the length of the mesh. The mesh material can also stretch along the longitudinal axis of the mesh. Lengthening of the mesh when stretched longitudinally reduces the width of the mesh layer. The mesh material may have a dominant direction of stretch depending on the shape and direction of the weave in which the mesh material stretches a greater distance relative to an inferior stretch direction which is generally perpendicular to the dominant stretch direction. FIG. 29 illustrates a sheet 38 of mesh material having a plurality of filaments forming a weave having a primary dominant stretch direction 40 and a secondary inferior stretch direction 42. The mesh sheet 38 may be cut into strips 44. The strips 44 are spaced apart and then stretched in the direction of the secondary stretch direction 42 to a maximum elongation in the secondary stretch direction 42. The mesh strips 44 are maintained at the maximum elongation and a layer 16 of uncured silicone is applied over the mesh strips 44 as shown in FIG. 30. The silicone layer 16 is allowed to cure while the mesh strips 44 remain stretched. After the silicone layer 16 has cured the mesh strips 44 and silicone layer 16 is trimmed as desired. With reference to FIGS. 29-31, when the strips 44 are released, the resulting simulated tissue structure 10 is very stretchy in the primary dominant stretch direction 40 and resists stretching in the secondary inferior stretch direction while having a minor insubstantial effect on the final shape of the structure 10 but has a major effect on the tactile qualities such as stretch.

The above-mentioned methods involve carefully combining uncured silicone with pre-made and stretched silicone or mesh material, which results in a more lifelike feel and appearance of the simulated anatomy. The degree of the effects produced by the resultant simulated tissue structure can be controlled by altering the thickness and durometer of both the pre-made stretched silicone pieces and the wet silicone being used. The larger the difference in thickness and durometer between the cured and wet silicone being use, the greater and more dramatic the effects will be in the resulting simulated tissue structure.

All of these techniques are ways of intentionally incorporating residual stress into simulated anatomy. There are many examples in the human body with structures that contain residual stress, and these techniques aim to mimic these real tissue structures in terms of look, feel, and manufacturability.

Currently, many organ structures are made in several pieces in order to reduce the complexity of the molding. These pieces are then glued together in order to get a desired curved shape. Advantageously, through the use of pre-stretched pieces in order to create residual stresses according to the present invention, less complex molds can be used. Additionally, in order to create curved simulated intestines, a straight tube is currently "kinked" in order to take the desired path. Advantageously, residual stresses of the present invention can help create more realistic curves without collapsing tubes through kinking and still allow for easy demolding.

It is understood that various modifications may be made to the embodiments disclosed herein. Therefore, the above description should not be construed as limiting, but merely as exemplifications of preferred embodiments. Those skilled in the art will envision other modifications within the scope and spirit of the present disclosure.

I claim:
1. A simulated tissue structure comprising:
a strip of cured silicone;
a layer of silicone; and
a tubular vessel attached to the strip of cured silicone and the layer of silicone,
wherein a final shape for the simulated tissue structure from a combination of the strip of cured silicone, the layer of silicone, and the tubular vessel is spiraled or tortuous.
2. The simulated tissue structure of claim 1, wherein the layer of silicone has an uncured state and a cured state and the tubular vessel is attached to the strip of cured silicone by the layer of cured silicone initially being in the uncured state and then the cured state.
3. The simulated tissue structure of claim 2, wherein the layer of silicone has an uncured state and is disposed on the strip of cured silicone while the layer of silicone is in the uncured state.
4. The simulated tissue structure of claim 1, wherein the strip of cured silicone is stretchable along a longitudinal axis.
5. The simulated tissue structure of claim 4, wherein the layer of silicone has an uncured state and is applied onto the strip of cured silicone while the strip is stretched and the layer of silicone is in the uncured state.

6. The simulated tissue structure of claim 5, wherein the tubular vessel is placed on the strip while the strip is stretched and the layer of silicone in the uncured state is wet.

7. The simulated tissue structure of claim 1, wherein the tubular vessel is solid.

8. The simulated tissue structure of claim 1, wherein the tubular vessel is hollow.

9. The simulated tissue structure of claim 1, wherein the tubular vessel has a spiral shape.

10. The simulated tissue structure of claim 4, wherein the tubular vessel is placed in a spiral fashion around the strip of cured silicone while the strip is stretched.

11. The simulated tissue structure of claim 7, wherein the tubular vessel is wrapped around the strip of cured silicone without tension.

12. The simulated tissue structure of claim 1, wherein the strip of cured silicone has a relaxed length longer than its relaxed width.

13. The simulated tissue structure of claim 1, wherein the strip of cured silicone comprises mesh material.

14. The simulated tissue structure of claim 13, wherein the mesh material has a dominant stretch direction with a stretch distance greater than an inferior stretch direction, and wherein the mesh material is stretchable with a limited stretch distance in one direction and a full stretch distance in another direction.

15. The simulated tissue structure of claim 14, wherein the strip of cured silicone comprising the mesh material is configured to simulate a tendon with an ability to bend and flex but not readily stretch.

16. A simulated tissue structure comprising:
a stretchable strip;
a silicone layer; and
a tubular vessel being configured to twist and bend the stretchable strip and the silicone layer into a spiraled or tortuous shape.

17. The simulated tissue structure of claim 16, wherein the tubular vessel is adhered onto the stretchable strip by curing of the silicone layer.

18. The simulated tissue structure of claim 16, wherein the tubular vessel is adhered onto the stretchable strip while the stretchable strip is stretched, and the spiraled or tortuous shape is formed when the stretchable strip is no longer stretched.

19. The simulated tissue structure of claim 16, wherein the tubular vessel is solid and is wrapped around the stretchable strip without tension, the stretchable strip comprising silicone.

20. A simulated tissue structure comprising:
a silicone strip;
a silicone layer attached to the silicone strip; and
a silicone vessel attached to the silicone strip and the silicone layer, the silicone strip, the silicone layer and the silicone vessel together having a tortuous shape.

* * * * *